No. 785,436. PATENTED MAR. 21, 1905.
C. POYET & G. B. M. GOODWIN.
R. BRAASCH & C. TRILLER, EXECUTORS OF C. POYET, DEC'D.
CONFECTIONERY COATING MACHINE.
APPLICATION FILED MAY 10, 1902.

4 SHEETS—SHEET 1.

WITNESSES
F. N. Roehrich
J. E. Prager

INVENTORS
Claude Poyet and
George B. M. Goodwin
BY J. H. Freeman
ATTORNEY

No. 785,436. PATENTED MAR. 21, 1905.
C. POYET & G. B. M. GOODWIN.
R. BRAASCH & C. TRILLER, EXECUTORS OF C. POYET, DEC'D.
CONFECTIONERY COATING MACHINE.
APPLICATION FILED MAY 10, 1902.

4 SHEETS—SHEET 3.

WITNESSES:
F. N. Roehrich
J. E. Prager

INVENTORS
Claude Poyet and
George B. M. Goodwin
BY J. H. Freeman
ATTORNEY

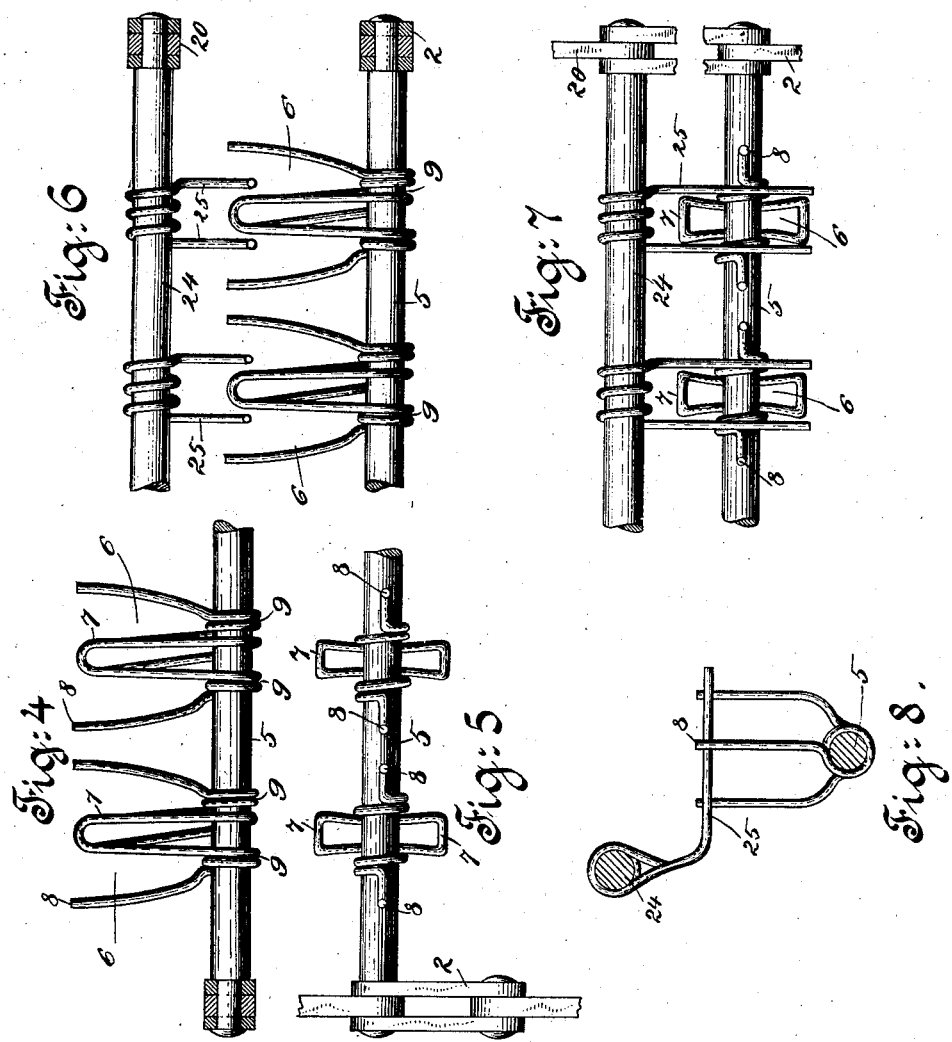

No. 785,436. Patented March 21, 1905.

UNITED STATES PATENT OFFICE.

CLAUDE POYET AND GEORGE B. M. GOODWIN, OF NEW YORK, N. Y.; ROBERT BRAASCH AND CHARLES TRILLER EXECUTORS OF SAID CLAUDE POYET, DECEASED.

CONFECTIONERY-COATING MACHINE.

SPECIFICATION forming part of Letters Patent No. 785,436, dated March 21, 1905.

Application filed May 10, 1902. Serial No. 106,786.

*To all whom it may concern:*

Be it known that we, CLAUDE POYET and GEORGE B. M. GOODWIN, citizens of the United States, and residents of the city, county, and State of New York, have invented certain new and useful Improvements in Confectionery-Coating Machines, of which the following is a specification.

Our invention relates to machines for coating confectionery or the like. While machines may be constructed in accordance with the principles of our invention for coating various forms and kinds of confectionery with various materials, our invention as to some of its features is more particularly adapted for coating confectionery, nuts, &c., with chocolate.

Our invention has for an object to provide a machine which is more rapid and more reliable in operation as regards the quality and quantity of the product than any of the machines heretofore devised.

Other objects of our invention are to provide a machine which is simple in construction, which requires but little attention, and which at the same time produces a product which is more uniform and more nearly approaches in appearance hand-coated confectionery than the product of any of the prior machines.

These and other objects of our invention will more fully appear from the following description.

Our invention consists in the novel parts, improvements, and combinations herein shown and described.

The accompanying drawings, which are referred to herein and form a part hereof, illustrate one embodiment of the invention and serve in connection with the description herein to explain the principles of the invention and the best mode contemplated by us of carrying the invention into effect.

Figure 1:
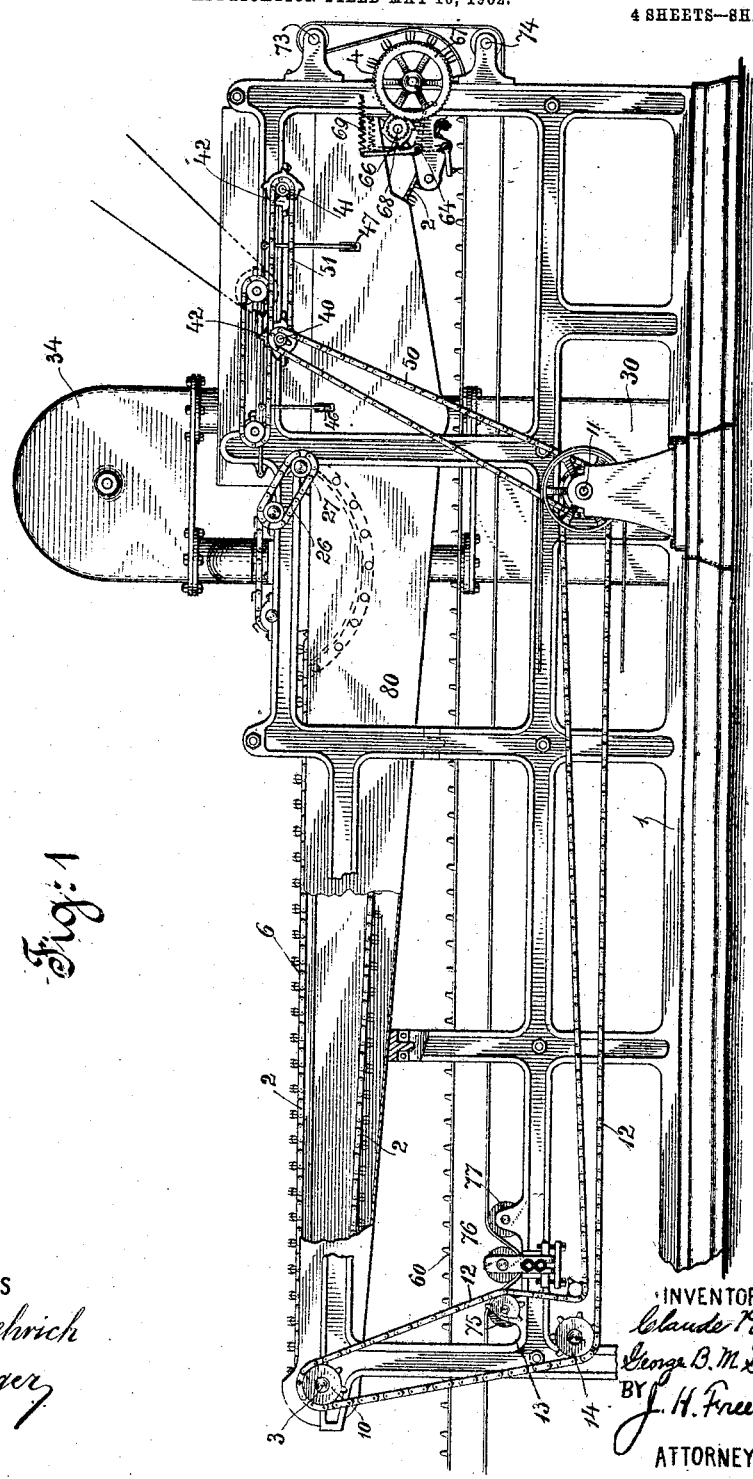
Figure 2:
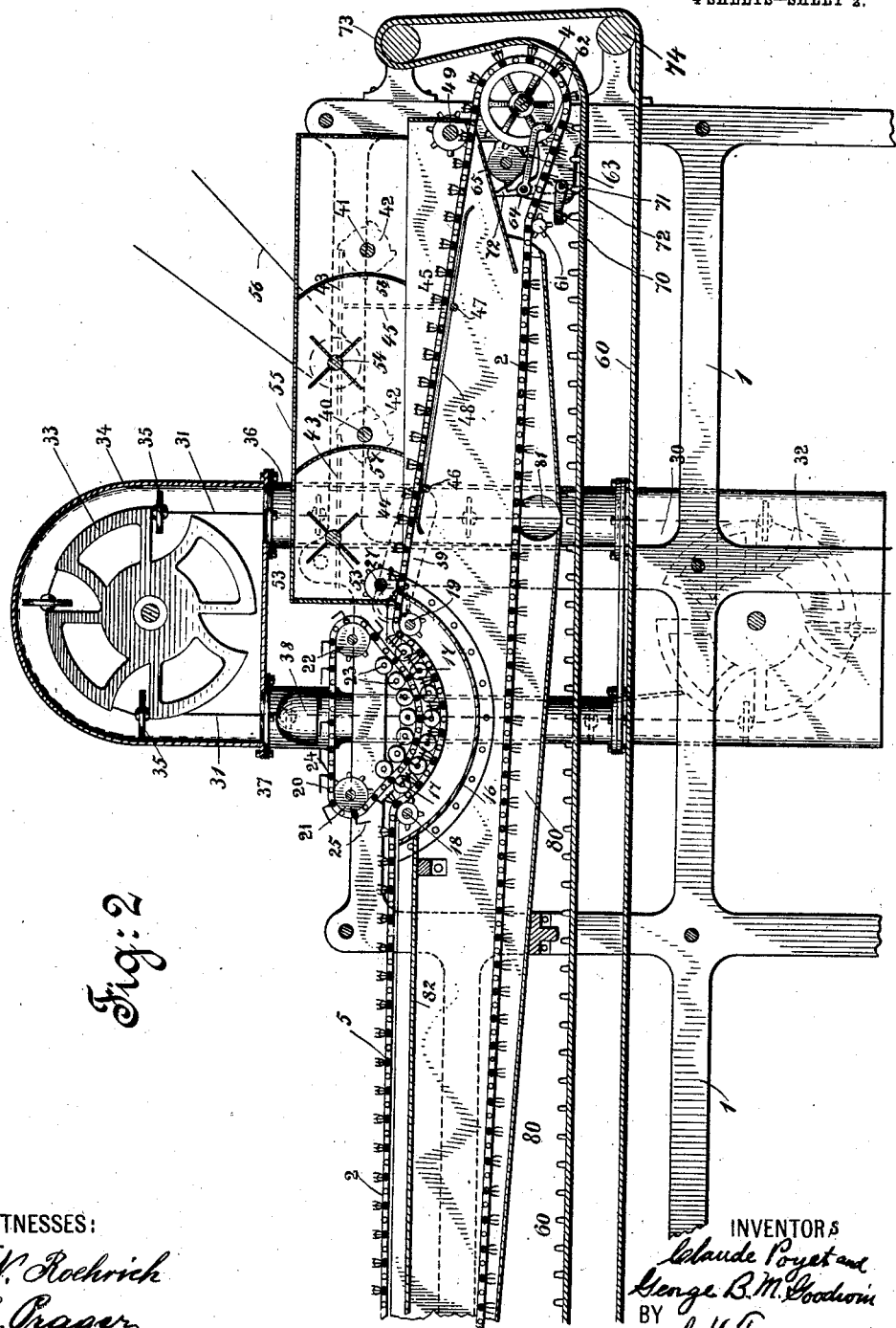
Figure 3:
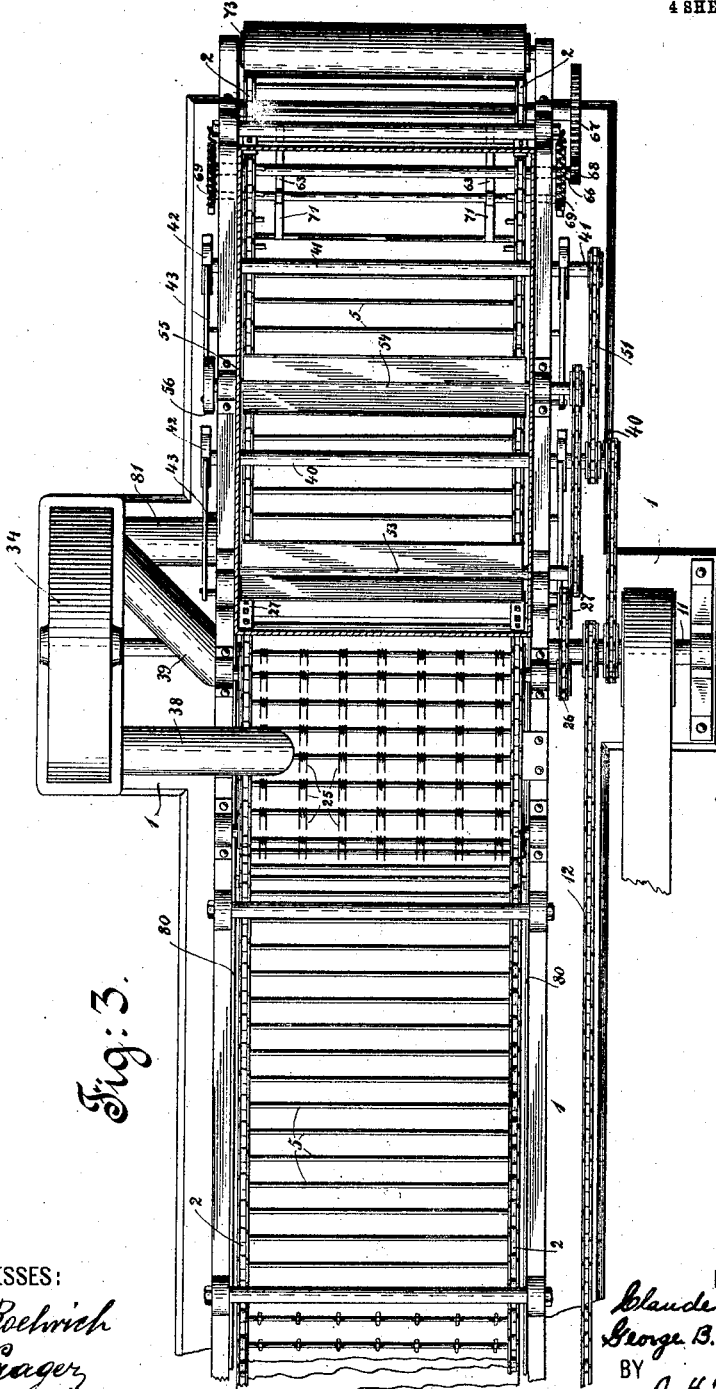

Of the drawings, Figure 1 is a side elevation of a machine constructed in accordance with our invention. Fig. 2 is a longitudinal section of the portion of the same shown at the right in Fig. 1. Fig. 3 is a plan view of the same. Figs. 4 to 8, inclusive, are side and plan views illustrating certain details of the machine on an enlarged scale.

A machine constructed in accordance with the principles of our invention comprises in general the combination of an endless carrier having closely arranged throughout its length and breadth open skeleton holders for the confectionery, means for applying the coating material to the confectionery in the carrier, and means for receiving the coated confectionery as it is delivered from the carrier.

In accordance with one feature of the invention the means for applying the coating material comprises a tank with means for maintaining a substantially uniform level of the coating material in the tank and means for so directing the carrier through the tank as to submerge the confectionery in the coating material.

In accordance with another feature of our invention the holders for the confectionery are inverted after they leave the means for applying the coating material and a suitable carrier is provided to receive the coated confectionery as it is delivered from the holders.

Referring to the drawings in detail, 1 represents a suitable framework upon which the various parts of the machine are operatively mounted in coöperative relation. The endless carrier for receiving the cores or "centers" of the confectionery and conveying them through the various steps of the coating process consists, in accordance with the embodiment of our invention illustrated, of a pair of endless chains or belts 2, which are mounted at opposite sides of the machine upon suitable sprocket-wheels carried by the transverse shafts 3 and 4, journaled at opposite ends of the frame. Extending transversely of the machine and secured at their opposite ends in the chains are a series of bars or rods 5, each of which is provided with a series of skeleton or open-work baskets or holders 6. These holders may be made of any suitable form to correspond to the shape or configuration of the cores which are to be coated. The holders are open at one end, so that the cores may be readily dropped therein and so that the coated product may be readily discharged therefrom. The holders may be made and attached to the rods 5 in any suitable way. As shown in Figs. 4 to 8, inclusive, each of the holders consists of a piece of wire so bent as to form a pair of upright loops 7, forming two sides of the holder, and a pair of upright ends forming the two remaining sides of the holder, the loop 7 and the ends 8 being connected by the convolutions 9, which embrace the rods 5 and are preferably rigidly fixed thereto, as by means of solder. The holders 6 are preferably closely arranged along the rods 5, and the rods 5 are arranged at close intervals along the chains 2, there preferably being a rod 5 for each alternate link in the chains. There is thus provided a carrier having a large number of holders for the confectionery, the capacity of the machine being limited only by the width of the carrier and the speed at which it is driven.

For the purpose of driving the carrier the shaft 3 is provided at one end with a sprocket-wheel 10, which receives motion from the main shaft 11 by means of a chain 12, which is suitably guided by the intermediate sprockets 13 and 14.

As far as some of the features of our invention are concerned any suitable means may be provided for applying the coating material to the confectionery in the carrier. Preferably, however, a suitable dipping-tank 16 is arranged adjacent to the upper stretch of the carrier 2 and means are provided for so depressing the carrier within the tank 16 as to cause the confectionery to be submerged in the coating material during the passage of the carrier through the tank. The means shown for depressing the carrier consists of a series of stud-rollers 17, which are arranged to engage the chains 2 and cause them to travel in a curved path below the level of the coating material in the tank 16, the chains being guided into and out of the tank by the sprocket-wheels 18 and 19, respectively. Any suitable means may be provided for preventing the core-pieces from floating out of the holders 6 as the latter pass through the coating material. Preferably, and as shown, a second endless carrier is provided for this purpose, the same consisting of a pair of belts or chains 20, mounted on suitable sprockets 21 and 22, arranged above the tank 16. The chains 20 are depressed to conform to the path of the carrier 2 by a series of stud-rollers 23. Mounted at their opposite ends in the chains 20 are a series of transverse rods or bars 24, which are spaced to correspond with the bars 5. The bars 24 are provided with sets of fingers 25, which are spaced along the bars 24 to correspond to the holders 6 on the bars 5 and are adapted to register with and close the open ends of the holders 6 during the passage of the latter through the tank 16. The chains 20 may be driven by any suitable means, as by chain 26 and sprockets 27, which receive motion from the chains 2.

Any suitable means may be provided to maintain a supply of coating material in the tank 16. We preferably employ a suitable pump to elevate the material from a supply-tank 30, arranged near the base of the machine, an overflow being provided from the dripping-tank 16 back to the supply-tank to keep the material in constant circulation. The form of pump illustrated consists of an endless belt 31, which is mounted on a pair of wheels 32 and 33, the former of which is located in the supply-tank 30 and is mounted on the main shaft 11 and the latter of which is mounted in a suitable casing 34, arranged above the tank 16. The belt 31 is provided at suitable intervals with diaphragms or buckets 35, the wheels 32 and 33 being provided with suitable recesses to accommodate the buckets 35. The tank 30 and the casing 34 are connected by tubes 36 and 37, which form passages for the opposite strands of the belt 31. The tube 36 is large enough to permit free downward passage of the buckets 35, but the tube 37 is so restricted from its lower end to a point near the top as to closely fit the buckets 35, and thus enable them to convey the material upwardly from the tank 30 to a spout 38, which discharges the material into the tank 16. In order that the material may be kept in circulation and in order that a substantially uniform level may be maintained in the tank 16, an overflow-passage 39 is provided between the tank and the tube 36.

For the purpose of agitating the carrier as it leaves the tank 16, so as to shake off the excess of coating material from the cores and the holders, the following mechanism is provided: A pair of shafts 40 and 41 are journaled in the frame above the carrier 2. Each of these shafts is provided at each end with a suitable cam 42, each of which cams engages a lever 43, suitably pivoted on the frame. The levers 43 at opposite sides of the machine are connected by links 44 and 45 with the opposite ends of the transverse bars 46 and 47. The bars 46 and 47 pass underneath the upper stretch of carrier 2 and are provided with longitudinal track-bars 48, which lie beneath the chains 2. As the shafts 40 and 41 rotate, the cams 42 will act to lift the chains 2 and let them drop back suddenly, so as to jar off the surplus coating material. Sprocket-wheels 27 and 49 are arranged near the opposite ends of the track-bars 48 to prevent the chains 2 from being displaced by the action of said bars.

The shafts 40 and 41 may be driven from the main shaft 11 by a chain 50, the two shafts being connected by a chain 51.

To assist in the removal of the surplus coating material, a pair of fans 53 and 54 are provided, the same being housed in a casing 55 and driven from any suitable source of power by a belt 56. In order to direct the air from the fans against the coated confectionery in the carrier, suitable guides 57 and 58 may be provided.

As far as some of the features of our invention are concerned any suitable means may be provided to receive the coated confectionery as it is delivered from the holders 6. In accordance with this feature of our invention we employ a conveyer in the form of an endless belt or apron 60, which is preferably arranged to make contact with the outer open ends of the holders 6 while the latter are being inverted by passing around the sprockets on the shaft 4. By reason of this construction the coated confectionery is nicely delivered into the apron 60 with the proper side up and at uniformly-spaced intervals. For the purpose of insuring the delivery of the confectionery from the holders the carrier 2 is guided away from the apron 60 at a suitable angle by the guide-sprockets 61, and means are provided to tap the back of each of the bars 5 as the holders thereon begin to recede from the apron in order to loosen any of the pieces of coated confectionery which may tend to stick in the holders. The means shown for this purpose consists of a transverse bar 62, which is mounted on arm 63, carried by rock-shaft 64. The bar 62 is raised and allowed to drop back at suitable intervals by means of a cam 65, driven from shaft 4 by suitable gears 66 and 67, said cam being adapted to engage an arm 68 on the shaft 64. A tension-spring 69 may be so connected to the arm 68 as to increase the impact of the bar 62.

For the purpose of marking the coated confectionery we may provide an intermittently-operated device to make contact with each line of the coated confectionery as it rests on the apron 60. This device consists of a bar or a series of arms 70, which are mounted on a rock-shaft 71, said shaft having an arm 72, adapted to be operated by the cam 65 or by another cam on the same shaft. By setting the arms 70 so that they will touch the tops of the pieces of coated confectionery and by giving the contact portion of the arms a suitable configuration they will act by raising slight ridges on the coating to give the pieces any desired mark.

The apron 60 is guided around and in contact with the carrier by suitable guide-pulleys 73 and 74. The apron 60 may be extended beyond the machine and through a cooling apparatus, if desired, to any suitable point of delivery. For the purpose of assisting the driving of the apron a series of rollers 75, 76, and 77 are arranged to engage the lower stretch of the apron, the same being located near the left end of the machine, as shown in Fig. 1. One of the rollers, 75, is driven by the chain 12 and the intermediate roller, 76, and is preferably made adjustable, so as to regulate the tension of the apron.

For the purpose of collecting the drip from the carrier 2 and returning the same to the tank 30 a suitable drip-pan 80 is arranged beneath the carrier, the bottom of the pan being sloped to a low point opposite the tube 36 and connected thereto by a passage 81.

With the object in view of providing ample room for the filling of the holders in the carrier 2 with cores the carrier is extended a considerable distance to the left, as seen in Fig. 1, or in advance of the dipping-tank 16, so as to provide space for several feeders to get at the carrier. To prevent the dust or powder which inevitably drops from the cores as they are placed in the carriers from falling into the drip-pan 80, where it would contaminate the coating material, a shield-plate 82 is arranged beneath the upper stretch of the carrier 2.

The operation of the machine having been fully described in connection with the description of the various parts thereof, further description of the operation will be unnecessary.

Our invention in its broader aspects is not limited to the precise construction shown nor to the particular construction by which it may be carried into effect, as many changes may be made in the construction without departing from the main principles of the invention and without sacrificing its chief advantages.

Having thus described our invention, what we claim, and desire to secure by Letters Patent, is—

1. In a confectionery-coating machine, the combination of a tank for the coating material, an endless flexible carrier having suitable holders for the confectionery, means for supporting and giving it a substantially continuous movement, said means being constructed to direct the holders through the tank so as to coat the confectionery, and means for receiving the coated confectionery from the said holders, said holders and said receiving means coacting to deliver and retain the coated articles on their bases.

2. In a confectionery-coating machine, the combination of a tank for the coating material means for maintaining the coating material at a substantially uniform level in the tank, an endless flexible carrier having suitable holders for the confectionery, means for supporting the carriers and giving them a substantially continuous movement, said means being constructed to direct the holders through the tank so as to coat the confectionery, means for receiving the coated confectionery from the holders, said holders and said receiving means coacting to deliver and retain the coated articles on their bases.

3. In a confectionery-coating machine, the combination of a tank for the coating material, an endless flexible carrier having open skeleton holders for the confectionery, means for supporting the carrier and giving them a substantially continuous movement, said means being constructed to direct the holders through the tank so as to submerge the confectionery in the coating material, means for retaining the confectionery in the holders while the latter are passing through the coating material, and means for receiving the coated confectionery from the holders, said holders and said receiving means coacting to deliver and retain the coated articles on their bases.

4. In a confectionery-coating machine, the combination of a tank for the coating material, an endless flexible carrier having open skeleton holders for the confectionery, means for supporting and guiding the carrier, said means being constructed to direct the carrier through the tank so as to submerge the confectionery in the coating material, and means for retaining the confectionery in the holders while the latter are passing through the coating material, said retaining means consisting of a second endless carrier arranged above the first carrier and having fingers adapted to close the holders.

5. In a confectionery-coating machine, the combination of a tank for the coating material, means for maintaining the coating material at a substantially uniform level in the tank, an endless flexible carrier having open skeleton holders for the confectionery, means for supporting and guiding the carrier and for giving it a substantially continuous movement, said guiding means being constructed to direct the carrier through the tank so as to submerge the confectionery in the coating material, and means supported independently of the carrier for retaining the confectionery in the holders while the latter are passing through the coating material.

6. In a confectionery-coating machine, the combination of a tank for the coating material, an endless flexible carrier having open skeleton holders for the confectionery, means for supporting the carrier and giving it a substantially continuous movement, said means being constructed to direct the carrier through the tank so as to submerge the confectionery in the coating material and to reverse the carrier after it leaves the tank so as to invert the holders, a conveyer for receiving the coated confectionery from the holders, and means for moving said conveyer with the inverted holders.

7. In a confectionery-coating machine, the combination of a tank for the coating material, an endless flexible carrier having open skeleton holders for the confectionery, means for supporting and guiding the carrier and for giving it a substantially continuous movement, said means being constructed to direct the carrier through the tank so as to submerge the confectionery in the coating material and to reverse the carrier after it leaves the tank so as to invert the holders, means for removing the surplus coating material from the confectionery after it leaves the tank, a conveyer for receiving the coated confectionery from the holders, and means for moving said conveyer with the inverted holders.

8. In a confectionery-coating machine, the combination of an endless flexible carrier having a multiplicity of suitable holders for the confectionery, said holders being closely arranged in both longitudinal and transverse directions on the carrier, means for supporting the carrier and giving it a substantially continuous movement, means for applying a coating material to the confectionery in the holders, and means for receiving the coated confectionery from the holders, said holders and said receiving means coacting to deliver and retain the coated articles on their bases.

9. In a confectionery-coating machine, the combination of an endless flexible carrier having a multiplicity of open skeleton holders for the confectionery, said holders being closely arranged in both longitudinal and transverse directions on the carrier, means for applying a coating material to the confectionery in the holders, means for supporting and continuously moving the carrier, and means for receiving the confectionery from the holders, said holders and said receiving means coacting to deliver and retain the coated articles on their bases.

10. In a confectionery-coating machine, the combination of an endless flexible carrier having open skeleton holders for the confectionery, said holders being closely arranged adjacent to each other throughout the length and breadth of the carrier, means for applying the coating material to the confectionery in the carrier, means for removing the surplus coating material, said means comprising an air-blast, means for supporting and continuously moving the carrier, and a conveyer to receive the coated confectionery from the holders, said holders and said conveyer coacting to deliver and retain the coated articles on their bases.

11. In a confectionery-coating machine, the combination of an endless carrier having skeleton holders for the confectionery, means for applying the coating material to the confectionery in the carrier, means for supporting and moving the carrier, said supporting means being arranged to reverse the carrier so as to invert the holders, a conveyer for receiving the coated confectionery from the holders, and means for supporting said receiving-conveyer so as to cause it to travel in contact with the holders as they are inverted.

12. In a confectionery-coating machine, the combination of an endless flexible carrier having open skeleton holders for the confectionery, said holders being closely arranged adjacent to each other throughout the length and breadth of the carrier, means for applying the coating material to the confectionery in the carrier, means for supporting and continuously moving the carrier, said supporting means being constructed to reverse the carrier so as to invert the holders after the coating has been applied, an endless flexible conveyer for receiving the coated confectionery from the holders, and means for supporting said receiving-conveyer so as to cause it to travel in contact with the holders as they are inverted.

13. In a confectionery-coating machine, the combination of an endless flexible carrier having open skeleton holders for the confectionery, means for applying the coating material to the confectionery in the holders, means for supporting and moving the carrier, said means being constructed to reverse the carrier so as to invert the holders, a conveyer for receiving the coated confectionery from the holders, and means independent of the holder for marking the coated confectionery while on said conveyer.

14. In a confectionery-coating machine, the combination of an endless flexible carrier having open skeleton holders for the confectionery, said holders being closely arranged adjacent to each other throughout the length and breadth of the carrier, means for applying the coating material to the confectionery in the holders, means for supporting and continuously moving the carrier, said means being constructed to reverse the carrier so as to invert the holders, a conveyer for receiving the coated confectionery from the holders, and means for marking the coated confectionery while on said conveyer.

15. In a confectionery-coating machine, the combination of an endless flexible carrier having open skeleton holders for the confectionery, means for applying the coating material to the confectionery in the holders, means for supporting and moving the carrier, said means being constructed to reverse the carrier so as to invert the holders, a conveyer for receiving the coated confectionery from the holders, and means independent of the holder for marking the coated confectionery on said conveyer, said marking means being constructed to touch the tops of the freshly-coated pieces and form ridges thereon.

In testimony whereof we have signed our names to this specification in the presence of two subscribing witnesses.

CLAUDE POYET.
GEORGE B. M. GOODWIN.

Witnesses:
EDWIN SEGER,
J. H. FREEMAN.